Feb. 7, 1939.  L. G. BLACK  2,146,051
PROCESS AND EQUIPMENT FOR DEHYDRATING AND FUSING
Filed Dec. 30, 1935  5 Sheets-Sheet 1

Fig. 1

INVENTOR.
Leroy G. Black
BY Lyon Lyon
ATTORNEYS

Feb. 7, 1939. L. G. BLACK 2,146,051
PROCESS AND EQUIPMENT FOR DEHYDRATING AND FUSING
Filed Dec. 30, 1935 5 Sheets-Sheet 2

Fig. 2

INVENTOR.
Leroy G. Black
BY
ATTORNEYS

Patented Feb. 7, 1939

2,146,051

UNITED STATES PATENT OFFICE 2,146,051

PROCESS AND EQUIPMENT FOR DEHYDRATING AND FUSING

Leroy G. Black, Trona, Calif., assignor to American Potash & Chemical Corporation, Trona, Calif., a corporation of Delaware Application December 30, 1935, Serial No. 56,718

13 Claims. (Cl. 23—277)

This invention relates to several features of construction and combinations of features for the construction of novel furnaces and furnacing accessories.

While the present furnace has been designed and utilized for the melting of hydrated borax ($Na_2B_4O_7XH_2O$), it very obviously has application in a number of melting, calcining or roasting applications, and it is understood that the present exposition contemplates such uses. The invention also relates to certain details of operation; these are included with the description of the mechanical construction of the furnace and accessories. Such details of operation are, although described in terms of treating borax, also known to be applicable to other materials.

It is one object of this invention to provide a furnace which shall have new and novel features. One of these novel features resides in a type of construction which makes the firebox of the furnace, which firebox is subjected to thermal strain, independent of the portion of the furnace wherein the roasting or fusion takes place, termed the melting zone or the fusion zone in this exposition. In processes wherein this type of construction is useful, the greater part of the melting zone is generally kept relatively cool, while the firing zone or firebox is operated at a high temperature, and may fluctuate in temperature to a considerable extent. My type of construction prevents difficulties arising from such differences in temperatures. Likewise, in such processes as are contemplated for the use of this furnace, the bed of material in the melting zone, while remaining at a fairly low and constant temperature, is known oftentimes to undergo profound changes in volume due to chemical effects such as change of dehydration, change of composition, etc. In the ordinary type of brick construction, which construction is made integral with the firing zone, such volume changes may be ruinous to the entire furnace. However, certain features of the present construction eliminate these undesirable effects entirely.

It is another object of this invention to provide a furnace which may be fed raw material in a simple, satisfactory manner. It is a further object to provide feeding mechanisms which are superior to any known feeding device heretofore presented. Such improved feeding devices eliminate the necessity for providing mammoth force feeding devices, such as extra heavy screws, the well known substantially built stoker devices, gigantic plungers, etc. By the improved equipment and process of my invention, relatively light, flexible equipment may be used. Other objects of the invention will be obvious from the following description.

As previously cited, the present equipment was developed to be operated in the service of borax. However, it is to be distinctly understood that the construction of the furnace is novel and valuable for other uses, and that the present invention is to be in no way limited to the fusion of borax, although the major part of the description will be given in such terms. In a furnace for the production of crystalline anhydrous sodium tetraborate, it is important not to subject the molten borax to the high temperature for long periods of time. To meet this requirement, I have developed the furnace described herein. I operate this furnace in such a manner as to retain a relatively small charge undergoing treatment therein—feeding the material continually into the furnace and continuously removing the same.

When this type of furnace is used for dehydrating substances, there is naturally expelled from the bed of the material undergoing fusion, a certain quantity of water. In other cases, gases or fluids may also be liberated or otherwise caused to move around. I have found that if matter so liberated is allowed to come in contact with the usual exterior brick side walls and floor of the furnace, there is oftentimes created great damage. For instance, if water is liberated from the charge as vapor, and permeation of this water from the melting bed to the brick walls is allowed to take place (the water condensing upon the cooled walls and dissolving some of the soluble material) there results a crystallization of the solution so produced within the brick work. This has been known to expand the brick work and to destroy the wall entirely. In cases where corrosive gases are liberated, these gases may take the same course and cause very similar effects, attacking the brick or the mortar of the joints. In instances where such difficulties arise, I have found it possible to eliminate them by making my side walls and floor from a suitable metal, preferably integrally welded or riveted and calked. In the case of borax or other such salts, I have found that mild steel is eminently satisfactory. To resist corrosive gases or corrosive liquids, I employ corrosion resistant steel, such as the modern stainless steel or other suitable alloys.

One of the features of this system of smelting, calcining or fusing resides in the use of a bed of material itself to form the lining of the fusion zone. This bed of material is retained by the side walls and floor of the fusion zone, which side walls and floor have just been discussed.

The present invention, together with various further objects and advantages of the same, will best be understood from a description of a preferred form or example of the process and apparatus for dehydrating and fusing which embodies the present invention. I have, therefore, hereinafter described a preferred form of dehydrating and fusing furnace, by reference to the accompanying drawings, in which,—

Figure 1:
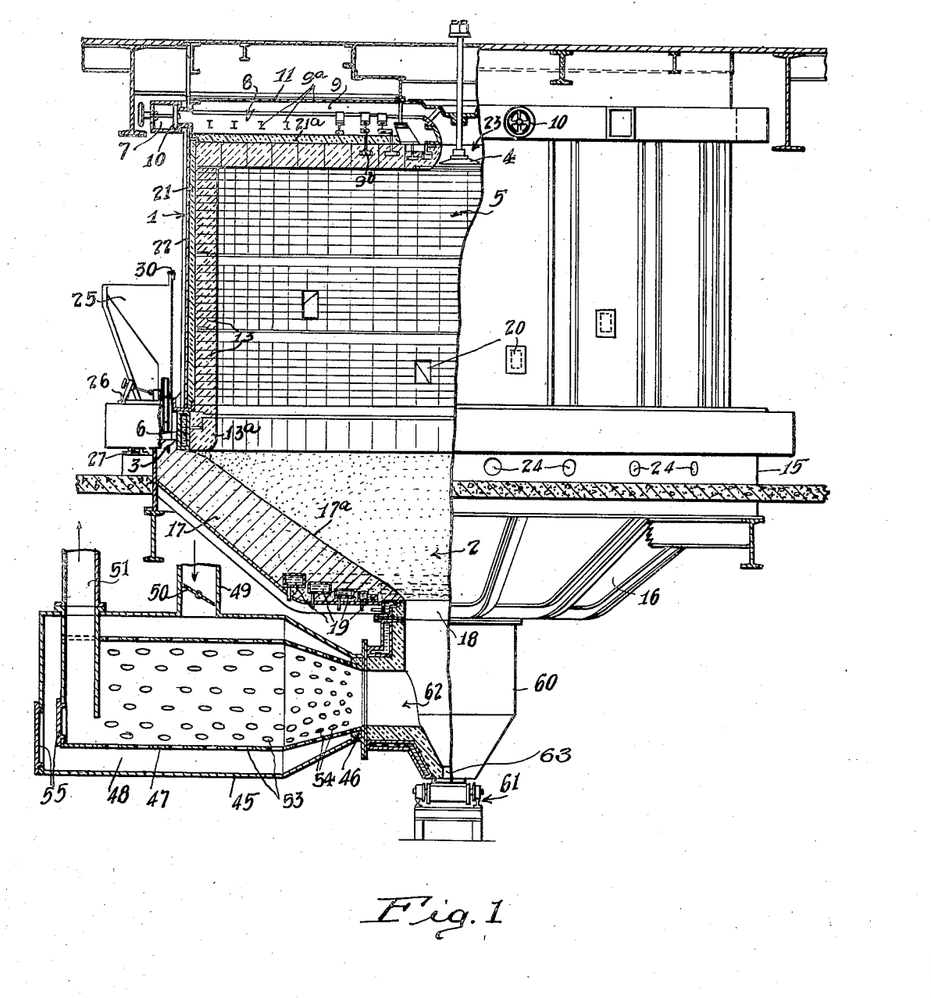
Figure 1 is an elevation, partially in section.

I shall now refer to Figure 1, which consists of a vertical section of one embodiment of my furnace. In Figure 1 the firebox is shown as 1 and the fusion chamber is shown as 2. One of the novel features of this furnace is the construction which provides, in effect, a telescoping construction between the firebox 1 and the fusion chamber 2. This telescope construction leaves or provides a gap or slot 3 through which feeding may be accomplished in a simple and effective manner. As will be more fully pointed out later, this telescoping of the firing zone 1 and the larger diameter fusion chamber walls 15 provides a simple and satisfactory seal for the entire furnace, when the gap or slot is filled with the feed material. Other advantages of my telescoping type of construction will become apparent upon further disclosure.

Turning now to the construction of the firebox 1, I prefer to use the modern suspended arch type of construction, both for the roof and for the side walls. Furthermore, I hang the firebox 1 independently of the fusion chamber 2. This construction is very much preferred, but I realize that it is possible to devise certain alterations which will result in my telescoping structure without being exactly the same as this preferred construction. Such constructions are, however, included within the scope of this invention.

Figure 1 depicts one form of this invention wherein the firing is done from the top. The burner 4 projects into the combustion space 5. This burner may handle gas, powdered coal, or fuel oil. The latter is preferable due to its cleanliness and the high radiation coefficient of a fuel oil flame. This furnace is essentially a radiation furnace and all or the greater part of the combustion takes place within the suspended firebox 1.

In the drawings, 6 depicts a water jacket which is placed adjacent to the feeding position to prevent overheating at that point. In many instances, especially if the furnace is not forced with respect to production capacity, such a water jacket is not needed and may be omitted or its use discontinued if desired. In the particular furnace depicted, 7 represents a circular duct supplied with air under pressure, which air is conducted through the space 8 over the supporting beams 9 of the furnace. The cooling of furnace walls and supporting steel by such means is common, and the use of this somewhat preheated air for the combustion of fuel is likewise well known. The regulating gates 10 are installed to provide uniform distribution of the cooling air over the I-beams 9, 9a and roof-brick hangers 9b. The cover 11 serves to provide closure or restriction for directing this air over the supporting members and into the combustion zone. Other means for cooling these supporting beams, such as direct exposure to the air, may also be used.

The hangers 12 serve to support the bricks 13 of the side walls. This type of construction, while relatively new to the art, is not claimed as novel in the present application. Such construction is available on the market, being manufactured by one or more well known tile and furnace companies. Therefore, many variations in the exact construction of this suspended firebox will be apparent to one skilled in the art of furnace construction.

The wall of the melting zone 2, as shown in Figure 1, is constructed of steel. Its uppermost extremity 14 (Figure 3) is seen to be well telescoped around the hanging firebox 1, thus forming the slot 3. The floor 16 of this melting zone, is also constructed of steel. The material to be fed is poured into the slot 3 and takes on its angle of repose, thereby forming the bed 17. This bed terminates at or near the furnace outlet 18 (Figure 1). The furnace is, of course, constructed so that the angles or slopes so formed will result in the molten material running into the outlet 18 without forming any appreciable pool of molten material within the furnace. The water jackets 19 are placed in the floor of the furnace at points where the bed 17 may become so thin that appreciable quantities of heat will be transferred to the floor material 16. In this particular design, I have chosen to step the water jackets in the manner shown so that the operator in looking through suitable peep-holes 20 may be able to judge the position and condition of the bed 17. These water jackets may extend as far outwardly, i. e. toward the side walls 15, as is needed or desired. While I have shown the floor 16 in a sloping form, more or less parallel to the bed face 17a, such construction is provided for convenience only. The floor 16 may be so constructed as to make an angle of 90° with the wall 15, if desired.

Generally, some provision is necessary for insulation of the melting zone wall and floor. It is one of the advantages of my type of construction and system of melting to cause material which is being treated to act as the insulation for the melting zone. The firebox 1, in part telescoped within the fusion zone, may be insulated in the usual fashion. In Figure 1, I place a retaining wall 22 of sheet steel, or other suitable material, about the furnace and pack the space between it and the fire brick with suitable insulating material, such as diatomaceous earth, 21. I also pack a layer of impervious insulating material 21a over the top of the suspended arch bricks. In this particular construction I am forcing air through the enclosed space 8 and this impervious insulating material serves not only to prevent heat leaks, but also prevents air under pressure from working its way into the furnace through the cracks in the brick.

In addition to the marked structural advantages which I obtain by suspending the firebox in the telescoping fashion hereinbefore described, this method of construction likewise provides a simple and effective means for feeding a furnace of this type. It will be noted that as a result of the telescoping of the firebox into the fusion zone, there is produced thereinbetween a slot 3. Into this slot there is poured the granular or other pseudo-fluid feed for the furnace. This feed may be introduced in any number of ways. It may be fed into the slot from a series of stationary hoppers so spaced as to give a fairly uniform distribution within said slot; manual labor may be utilized to level out the material in the slot, to maintain the flow, and to continually force the feed into the fusion zone. As depicted in Fig. 1, the angle of repose is such that a maximum of feed material is now delivered to the furnace. Under these conditions, any further addition of feed material will simply pile up within the slot 3. In operation, as the bed is melted back, usually at the extremity nearest the opening 18 and water jackets 19, this angle changes materially and it is possible to feed, manually if desired, by downward stoking, a further quantity of feed to again build up the bed 17.

In the exposition of this invention, and especially in the drawings which are submitted herewith, I show my furnace built in circular form. This form has certain advantages, especially if it is desired to construct the slot 3 formed by the telescoping of the firebox and fusion zone, as a continuous, non-obstructed opening. Such an opening allows continuous mechanical feeding, one form of which I will describe and claim as novel. However, there are many instances when this circular type of construction is neither necessary nor advantageous. In such instances, I construct the furnace in a rectangular fashion, said rectangle being either square in cross-section or oblong.

Due to the inherent symmetry of a circular type of construction, I prefer to fire this furnace from the top, as shown by the burner 4 which projects through the opening 23. The burner depicted is a Peabody fuel oil burner, which atomizes its oil under pressure without auxiliary high-pressure air or steam. Other vertical burners, of course, can be used. However, such position for the burner is not absolutely necessary for the successful operation of my equipment. In fact, there are several very useful burners on the market which can not be operated in a position vertically downward. In deference to such equipment, as well as in deference to other ideas of design and construction, the firing may be done within the firebox 1, horizontally or even vertically upwards, as shown in Figure 1 of my United States Patent No. 1,964,902. If desired, more than one burner may be utilized.

In case the furnace is built so that its cross-section is other than circular, its dimensions, feeders, stokers, etc. are arranged so that there will be maintained a sloping bed of material throughout the fusion zone, and so that material flowing from this sloping bed will flow by gravity, without appreciable obstruction, into an outlet opening, such as 18. Of course, more than one outlet opening may be provided, if for any reason it is desired. One reason for providing a plurality of outlets would arise in a large furnace wherein the material, once molten, would have to flow over a considerable distance while exposed to the flame. In the instance of smelting borax for the production of anhydrous crystalline sodium tetraborate, it is desirable that the molten material be removed from the furnace immediately upon becoming molten. It is undesirable to maintain the molten material in contact with the flame, or to otherwise superheat the molten fluid. If due to the design or size of the furnace such excessive heating of the product would result, then a plurality of outlets may be provided to remove the material rapidly.

As mentioned above, the mobile feed which is introduced into the slot 3 may be fed manually, or the feeding at least assisted manually. There are several minor mechanical variations with respect to the width and height of slot 3 which may be used under such arrangement. I have provided portholes 24 through the metal side wall 15 of the fusion zone for such a purpose. These portholes may be fixed with suitable closures. Such openings or their equivalent, provided for manual stoking, may be the sole means of feeding, or they may be used only to augment some other type of feeding. In the instance of the furnace which I have used most successfully and with the least expenditure of manual labor, I use the portholes shown, only for occasional poking of the upper part of the bed 17.

Figure 2:
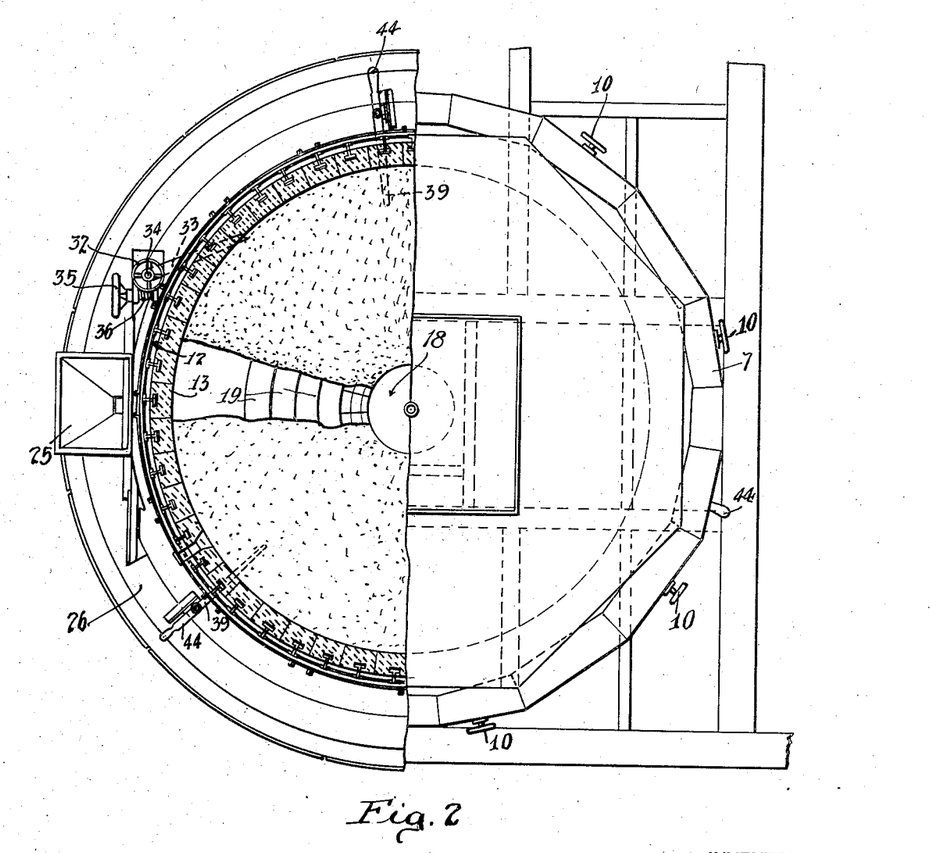
Figure 2 is a plan view, partially in section.
Figure 3:
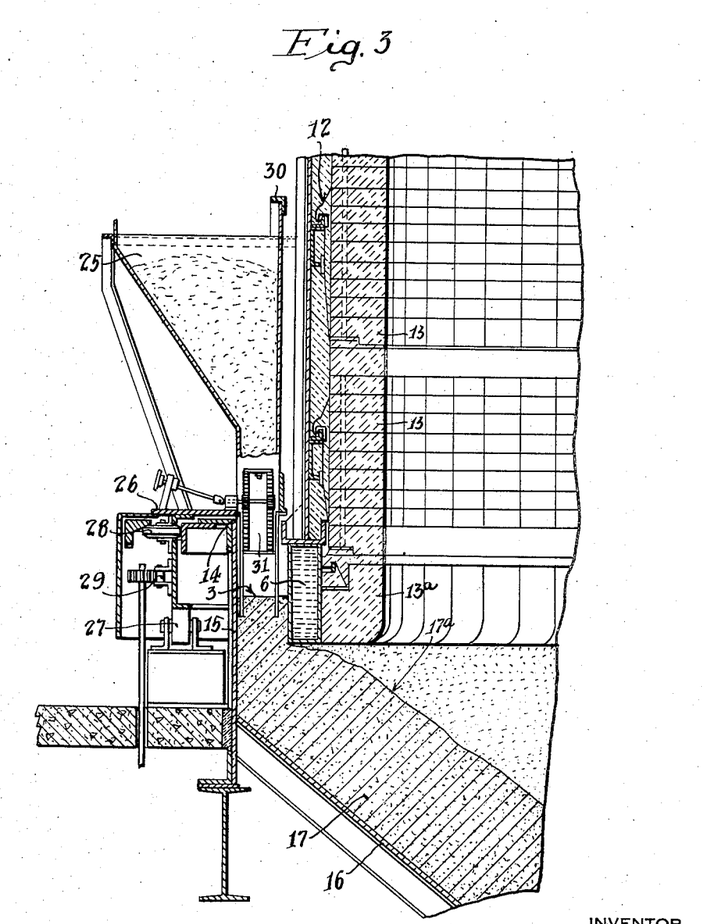
Figure 3 is a fragmentary section of the feed distribution mechanism.

In my preferred form of furnace and melting system, I employ continuous mechanical feeding. This feeding is continuous and mechanical both in its delivery of the mobile feed material to the slot 3 and also in introducing the material from slot 3 into the fusion zone. In Figures 1, 2 and 3 there is shown a rotating or traveling feed hopper 25. This feed hopper, together with other of the mechanical accessories used in the feeding, is carried on the rotating annular table 26, which table is supported upon, and rolls on, suitable bearings 27. Guide rolls, such as 28, may be provided for taking the lateral thrust. The table is caused to rotate by suitable motor, gear reducer and pinion (not shown) engaging the continuous chain, cogs or teeth 29. As the table rotates, the traveling hopper 25 (which may represent a plurality of hoppers, if desired) passes under a stationary feeding or storage bin (not shown). A suitable cam or other actuating mechanism may be provided on the hopper 25, as depicted at 30 in Figure 1. This cam serves to open the stationary feed hopper, delivering into the traveling hopper (or hoppers) a charge of raw material, and again closes the stationary hopper.

Regulation of the depth of feed material within the slot 3 may be accomplished by means of slide gates 31 suitably controllable. As the material is consumed from the bed 17 and passed out of the opening 18, further quantities of material are introduced into the slot 3 as the traveling hopper rotates. With this arrangement, if the traveling hopper finds that the level in the slot 3 has not diminished since its last passage at that point, there is no material delivered from the hopper into the slot. If, however, the level previously laid down by the nose or extremity of the traveling hopper has been lowered since its last passage over a particular point, then a further quantity of feed will be laid down upon that point. In actual operation, a rather thin layer of material is continuously fed by these traveling hoppers. In this manner, the supplying of raw material to the slot 3 becomes both automatic and uniform. If the slot requires feed, it is delivered; if it requires no feed, none is delivered and none is spilled out, wasted, or caused to jam the mechanism. Obviously, the mechanism which delivers feed to the traveling hopper 25 from the stationary hopper (not shown) is likewise arranged so that if the hopper is full, or becomes full before it has completed its passage under the stationary hopper, no excess of raw material is delivered to said traveling hopper and practically no spillage occurs. In this simple and effective manner, I am able to supply feed continuously and automatically to the slot 3, which is formed by the telescoping of the firebox 1 into the exterior boundaries of the fusion zone 2.

Having delivered feed to the slot 3, this feed may be introduced into the fusion zone to form the bed 17 or to replenish the bed 17, in any one of a variety of manners. At times, material which is sufficiently dry and granular may be allowed to feed in entirely by gravity. In other cases, manual assistance or stoking may be resorted to. This can be done, in the particular example given here, by poking downward in the slot 3, or it may be done through the portholes 24, which lie in a plane below the lower extremity of the firebox 1. Obviously, if continual stoking is accomplished through such portholes, then suitable lips may be provided on the lower side of them so as to prevent spillage of the material outwardly upon the floor. However, in keeping with my desire to conduct this operation mechanically, continuously, and with a minimum expenditure of labor, I provide, in lieu of manual stoking, certain automatic feeding means for introducing the material from slot 3 into the fusion zone.

Figure 4:
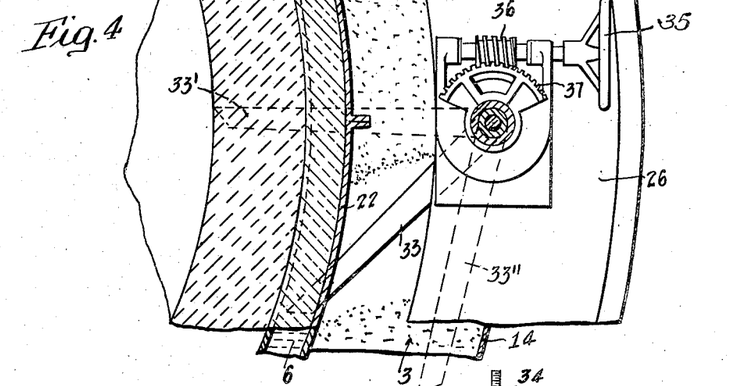
Figure 4 is a fragmentary plan of the feeding mechanism.
Figure 5:
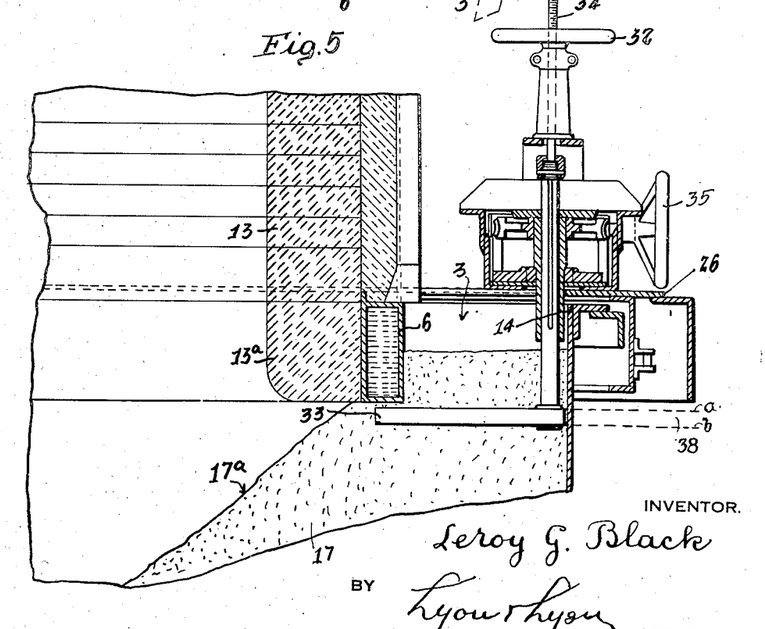
Figure 5 is a fragmentary section of the feeding mechanism.

Referring to Figures 4 and 5, I show thereupon the chief feeding means of my improved invention. This device I have termed a "plow", and will carry this nomenclature throughout the description. In Figure 5, a general assembly of the plow is shown. This plow rides upon the annular rotating ring 26 and serves to transfer the mobile feed material from the slot 3 into the fusion zone. The feeding mechanism proper consists of a member 33. It may have a depth or thickness, i. e. plowing face, from ½ to 1½ inches more or less, according to the quantity of feed which it is desired to have it displace. Its length is such that it may be, when extended inwardly, caused to project through the bed and into the open space in the fusion zone. The handwheel 32 working upon the thread 34 is provided for altering the elevation of this plow with respect to the lower extremity of the firebox. Generally, I prefer to operate this plow fairly close to the nose brick 13a and to the water jacket 6. The elevating mechanism is also useful for removing the plow from the slot 3 for purposes of inspection, repair, etc.

A valuable feature of this feeding mechanism or plow resides in the fact that it can be regulated or adjusted to give a greater or lesser feed. For instance, if the plow is allowed to trail in the slot 3, as shown in Figure 4 by its position 33", then it has very little tendency to introduce feed material from said slot into the fusion zone. On the other hand, if it is turned inwardly to the position, such as shown in Figure 4 by 33, a considerably greater quantity of material is introduced into the fusion zone. The length of the plow blade is such that it can be caused to clear the bed entirely very much as shown at position 33'. Regulation is brought about by means of a suitable worm gear 36 and spur gear 37, changes of position being had by adjustment of the handwheel 35. I have found that the feeding mechanism so provided is extremely sensitive, and extreme nicety of feed can be obtained with this arrangement.

It is obvious that when the plow is in one of its retarded positions, such as that shown by position 33 of Figure 4, it will not extend inwardly sufficiently to intersect the inner line of the bed 17. In the smelting of many materials, there is formed upon the surface which is exposed to the radiant heat a gummy crust. This crust may develop considerable strength and resistance to further addition of feed. While the mechanism of this invention may be built sufficiently strongly to force new material through this crust, such action is at times undesirable. I am aware that there have been invented, used, and patented great numbers of feeders working upon the principle of forcing material from the exterior of a pile, through said pile and into the fusion zone where it is exposed to the flame. Almost universally such feeders must be extremely heavily constructed. As a result of such mammoth construction, they become both cumbersome and expensive. Despite their size and strength, breakage often occurs and repairs are expensive. Furthermore, breakage of such feeders may result in shutting down the furnace, which as any one skilled in the art knows, is extremely bad practice. In addition to the harm done to the refractories, etc., the loss of production due to such shutdowns is undesirable.

If such "extruding" feeders are used in a material which tends to form a hardened surface where it is exposed to the flame, the feeding of material must of necessity occur in lumps or slabs which are more or less periodically pushed off the hardened surface and down onto the bed. It often occurs that following expulsion of the hardened surface a large volume of loose material flows down the bed behind it. This causes dusting in the furnace, and if the quantity of loose material so projected is sufficient it may at times pass directly into the outlet 18 without becoming fused or roasted. While the furnace can be operated under such slugging or under intermittent feeding conditions, the optimum in operation resides in smooth continuous feed.

In order to escape this effect of the older type of extrusion feeders, I have designed a system of feeding and an apparatus therefor which feeds in a continuous manner and which may be best described, not as an extrusion feeder but as a "pushover feeder" or a "channel feeder". In so far as I am aware, this system and apparatus is new and novel, and I make it a part of my claims. I term this a channel feeder, since by the method of my invention I maintain a clear or open channel just beneath the extremity of the firebox, 1, i. e. just below the nose tile 13a and the water jacket 6 of Figure 5. This channel, shown as 38 in Figure 5, although always kept full of the mobile feed material, is nevertheless maintained loose and free from the caking which may occur upon the surface of the heated bed.

Figure 6:
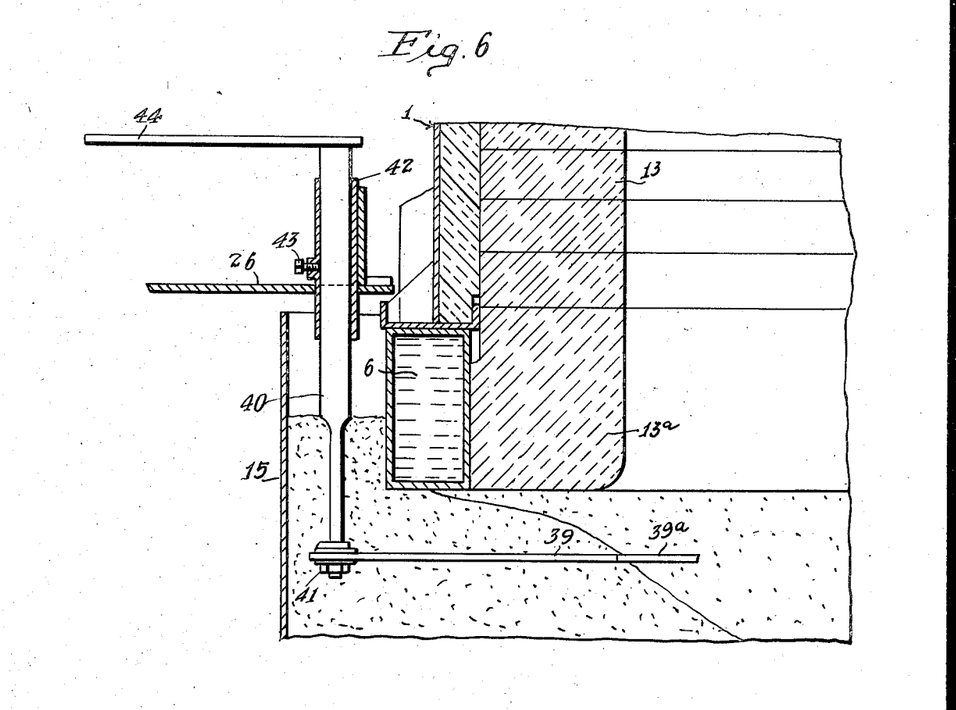
Figure 6 is a fragmentary section, showing the assembly of the cutter or knife used with the feeding mechanism.
Figure 7:
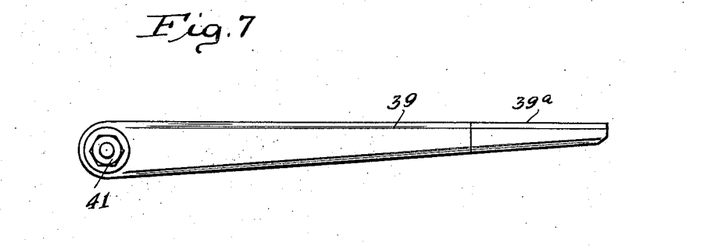
Figure 7 illustrates a knife or cutter used in the feeding mechanism.

In order to provide and to maintain this channel, I use a plurality of thin, swordlike, blades, to which I refer as "cutters", one of which is shown in Figure 2 as 39. Reference to Figure 6 shows an assembly of one of these cutters. It is carried upon the rotating, annular table 26, and rotates with the assembly of feed hoppers, plows and other cutters. The cutters, as shown in Figure 2, are not subjected to adjustment to vary the feeding. They are provided solely for the purpose herein described. As a result, they are usually operated pointing directly toward the center of the furnace. They are made of a strong metal, such as spring steel or some heat resistant modern alloy, the tip 39a being preferably made of the latter material. These cutter blades should be made relatively thin, say about ¼ inch in thickness, and they may be sharpened so as to offer less resistance and so as to cut better. Again referring to Figure 6, the cutter blade itself is shown as 39, being carried upon the shaft 40. An assembly nut 41 is provided for fastening the cutter blade to this shaft. The shaft is preferably cut away in one plane so as to streamline its movement through the bed of material in the slot 3. The shaft is supported by a sleeve 42, which is fixed to the rotating table 26. The set screw 43 is provided for holding the cutter in position. The handle 44 is used for turning the cutter into the bed or for bringing it out and up into sight for purposes of cleaning and inspection.

The fact that these cutter blades can be made of relatively light construction is a part of and consistent with one of the general principles of this invention. If the material in the bed were once allowed to set and become hard, as it does in the instance where the old type extrusion feeders are utilized, then the thin cutter blades and carrying mechanism would be twisted up, or otherwise distorted, immediately upon being forced (or upon attempting to force them) into the bed. However, according to my concepts, I start with and maintain an open channel by means of these cutters. With the channel so maintained, very little resistance is thereafter offered to the cutter blades and to the plow or plows. This is an entirely new concept and a departure from the old type of feeding mechanisms which have come to my attention. This channel is preferably placed just beneath the extremity of the firebox, as will be discussed more fully below.

As previously indicated, I find it desirable to utilize a plurality of these cutter blades. For instance, three or more of them may be operated upon the furnace depicted. The cutter blades may be operated both above and below the plow 33 of Figure 5, to assure a free channel for the plow and for the feed which has left the plow to enter the fusion zone. In general, I find it sufficient to operate but one cutter blade at the elevation a, shown in Figure 5. A plurality of cutter blades may advantageously be operated at the lower elevation b. The chief necessity for the upper cutter blade, operating in elevation a, is to prevent material from sticking to and accumulating upon the lower side of the nose brick 13a. Oftentimes the bed of material 17 will build out, i. e. take on a different angle of repose than is depicted in the drawings, and may even reach out as far as or farther than the nose brick 13a. This upper cutter aids in keeping the material off the nose brick as well as keeping the channel free at its upper plane. The lower cutter or cutters operate at a point at or below the lower extremity of the plow face, i. e. at the plane b, as shown in Figure 5. These lower cutters keep the bed open, allowing the plow to work freely and without appreciable resistance in the channel.

In order to insure the bed 17 being continually cut and the channel maintained, it is necessary that these cutter blades shall project through the bed somewhat into the firing space. In practical operation, I have found that the exact angle of repose of the bed is not always constant. Instead, as previously stated, the crest of the bed 17 may move inwardly or outwardly with respect to the center of the furnace. While the cutter blades might be turned slightly to compensate this, I prefer to use these cutter blades solely for the purpose of cutting and not for feeding. Were they turned at an angle, such as is the plow in its position 33 in Figure 4, they would have some tendency to act as feeders despite their narrow thickness. To maintain the feeding constant, the cutter blades are generally operated so that they project directly toward the center of the furnace. By this means no variations are introduced due to altering the angle of entrance of the cutters. Variation of feed rate is accomplished solely by varying the angle of the plow 33. Furthermore, by operating these cutters in a fixed position the shaft 40 may be cut away, as shown in Figure 6, in a plane perpendicular to the diameter of the furnace; that is to say, the reduced section of the shaft 40, shown in Figure 6, is reduced only in one dimension; in the other dimension it has the same width as the main part of the shaft.

In order to allow for variations in the angle of repose of the bed and changes in the position of the crest, I supply cutter blades of varying lengths. By the use of the nut 41 of Figure 6 cutter blades may be removed and longer or shorter ones substituted as the bed characteristics change from time to time. I prefer to operate the cutter blades in such a method that only a small amount of the blade projects through the bed and is exposed to the radiant heat within the furnace. In this manner rapid deterioration of the cutter blades is prevented.

Now summarizing the combined features of my feeding mechanism, which features of course can be used singly or together, I present the following:

The traveling hopper 25 is maintained full of the mobile feed material and rotates about the furnace rather slowly. In so rotating, it deposits a layer of the feed material within the slot 3, the height of the feed material within the slot being varied, as desired, by means of the slide gates 31 attached to the hopper. Such changes do not have to be made at short intervals, but the set is made according to the back pressure within the furnace and according to other factors, as discussed below. As the rotating table 26, carrying the hoppers, cutters and plows, moves around the furnace, the cutter blades slice through the bed of material projecting through near the crest, and maintain an open channel. It is understood, of course, that this open channel is not visibly open, but is completely filled or sealed with the mobile feed material. I call it an "open channel" because the material in this channel is not allowed to set up and harden as it does on the main surface of the bed or within the bed itself. As the plow moves around, it moves a certain amount of feed material through this open channel and over the crest of the bed. By virtue of this open channel, little resistance is offered to the material being moved inwardly by the plow and constant, sensitive regulation can be obtained. A small turn on the plow handwheel 35 of Figure 4 suffices to vary the quantity of feed appreciably.

In one great respect this type of feeder and method of feeding differs markedly from the common type. In addition to its mechanical advantages, this feeder is advantageous in that it supplies an entirely new and desirable type of feeding for this system of roasting or smelting. It is one of the desires in this type of furnace, and in this system, to calcine, roast, or melt the material and to get it out of the furnace with the least delay. In such processes uniformity of action is a most desirable characteristic. When this feeder is operating and the furnace is in balance, i. e. being fed at the same rate as the material is being withdrawn, the feeding consists of a "push-over" action rather than an "extruding" action, as provided by the older type of feeders. New material in friable form is continuously fed through the channel and over the top of the crest, whereupon it rolls downwardly toward the outlet 18. By varying the speed of the ring rotation and by providing sufficient cutter blades so that appreciable consolidation at the crest is prevented, the extent to which the material is pushed over and caused to roll down upon the bed may be controlled to a nicety.

For this reason, I provide the drive mechanism (not shown) for the rotating table 26 with a variable-speed, speed-reducing mechanism. With very little skill the operator is able to make the feed behave very much according to his desires. Of course, if the rotating table is speeded up, then the plows must be retarded to a certain extent if the quantity of material fed is to remain constant.

It will be noted that the plow itself does not stick through the bed into the firing zone. The tip of the plow operates variably somewhere between the feed slot 3 and the crest of the bed. Since it operates within the channel formed and maintained by the cutter blades, the plow is not called upon to overcome any appreciable degree of resistance. This feature allows a steady condition of feeding rate, regardless of appreciable changes within the bed itself. This combination of the maintenance of the aforedescribed channel and the freely acting plow enables me to secure a "jump-over" or "over the top" distribution of the material upon the melting bed or within the melting zone, heretofore unknown.

This jump-over feeding, i. e. the strewing of a certain amount of raw material well down upon the bed is of extreme value in many instances. For comparison, if the material is fed only at the top and where it is melted and allowed to run down, then there occur two undesirable features. First, the bottom of the bed 17 tends to melt out, and this melted-out area oftentimes is replaced only at rather long intervals by a complete slumpage of the entire crest of the bed, induced naturally or by heavy manual stoking. Second, especially in the instance wherein hydrated sodium tetraborate is melted to produce anhydrous crystalline sodium tetraborate, it is desirable that the material at the bottom of the bed should not become highly superheated before it passes out through the opening 18. If new feed is introduced or exposed to the flame mainly at the top of the crest during the greater portion of the time, then the material passing out the opening 18 has a tendency to become superheated. By means of my jump-over feeding action, which results in strewing in a quiet and uniform manner a large proportion of the new feed well down upon the sloping embankment 17a, I am able to distribute the feed in such a manner that it will be all melted when it reaches the outlet opening 18, but will not have become appreciably superheated.

While this action of avoiding superheating is important in the case of borax, the advantages of my improved type of feeder are also virtuous in other applications where superheating, per se, may not be greatly disadvantageous. Excessive dusting is prevented. By being able to distribute the feed over the face of the greater part of the embankment 17a, more rapid calcination, roasting or melting takes place. As a corollary, such a feeding system enables me to absorb more of the heat from the flame and to operate more efficiently.

In many instances, especially in case of hydrated substances or substances which undergo profound chemical change upon heating, there is exhibited a tendency to exfoliate upon entering the fusion zone. This is especially marked in the case of borax. If a blast flame such as an oxy-acetylene torch, is played upon the surface of borax, a great intumescence and puffing occurs, the surface of the material begins to melt, but thereafter the action practically ceases. During this intumescing there is produced a highly efficient insulating layer of puffed material which prevents or resists further transfer of heat from the flame to the borax below. One of the advantages of my equipment and system of feeding is that the incoming feed is strewn upon the surface in relatively small amounts where it is exposed with a large surface area to the radiation from the flame above. This makes for rapid melting of a material which is otherwise extremely difficult to melt.

In addition it can be visualized that the greater part of the sloping face 17a is covered with molten material traveling slowly downward toward the opening 18. When a new, small, batch of feed is conducted through the channel and strewn upon the bed, this material immediately comes in contact with the fluid material upon the bed. This rather simple action constitutes one of the novelties of the present invention, for by use of it I am able to bring about rapid melting of the recalcitrant feed material. I have found that such recalcitrant raw feeds, especially borax, are rapidly melted when placed upon a molten surface of hot fluid of like composition. In fact, after watching the action of the aforedescribed blow torch upon raw borax, it is almost unbelievable the rapidity with which the same borax will be dissolved or absorbed into a superheated molten surface. In this manner I am able to bring about a double action of heating and fusing this recalcitrant material. That is to say, I heat it and melt it on one side by exposure to direct radiation and to some extent by conduction from the hot gases, and I heat it and melt it on the other side by the hot molten material which is passing down the sloping embankment.

Finally this channel and push-over feed system combined with the present furnace structure prevents excessive dusting caused by the introduction of the feed material in large slugs. When smelting many materials, especially alkali salts, dusting is extremely undesirable since the alkali-salt dust attacks the brick work with great rapidity, thereby ruining it and oftentimes contaminating the product. In this respect, the construction features of my improved furnace are of great benefit. By constructing my furnace essentially in two separate telescoping sections, and feeding the raw material beneath the upper of said telescoping sections, while firing in the said upper section and melting in the lower section, I am enabled to prevent almost completely any attack of the alkali-salt dust upon the brick work of the firebox.

To further minimize this dusting and its effect upon brick work, I arrange my furnace, as shown on Fig. 1, to fire downwardly, removing the flue gases from the bottom. While this scheme represents the ultimate in prevention of brickwork attack, I do not claim downdraft firing as novel, and do not limit the valuable features of my invention to this arrangement alone. As previously specified, furnaces embracing my novel features may be constructed with rectangular outlines, firing may be done from the sides, horizontally, and finally the flue gases may be removed from the top, sides, or bottom, according to the tastes of the individual designer.

In the forepart of this description I have talked upon the desirability of providing the traveling feed hopper 25 of Fig. 1 with adjustable slide gates 31 for varying the depth of raw feed in the slot 3. Having now described my system of feeding by means of plows and cutter blades, it will be understood why I can not depend upon the material within the channel, or upon the material at the crest of the bed 17a, to provide a seal. Furnaces of this type may be operated either under conditions of slight positive or slight negative pressure. The furnace depicted operates under positive pressure. Under such conditions, if the upper level of the material in the slot 3 were allowed to be coincident with the extremity of the firebox 1, i. e., coincident with the bottom of the nose brick 13A and of the water jacket 6, then the hot furnace gases would be blown out through the slot 3. This has occurred in several instances during my experimental furnace operations, and when borax is being handled, the results are somewhat startling and disastrous. The hot gases striking the hydrated borax in the slot 3 puff the individual particles to a remarkable degree and blow them about the furnace room in such a way as to create a veritable snow storm.

I have found that I can not depend upon the material within the channel 38 of Fig. 5 to form a satisfactory seal, but that I must provide this seal within the slot 3 itself. For this reason slot 3 is made of considerable depth by telescoping the larger fusion zone 2 well up around the firebox 1. In this slot I carry sufficient depth of the raw feed material so as to overcome the pressure within the furnace. By carrying a sufficient depth of material in the feed slot, a perfect seal is formed regardless of whether the pressures within the furnace be positive or negative. The feed gates on the hopper are made adjustable, since these pressures may be altered from time to time to suit other operating conditions. In order to avoid excessive drag of the plow shafts, the cutter shafts, etc., through the material lying in the slot 3, I attempt to keep this depth of sealing material as thin as possible; hence the usefulness of the variable slide gate 31.

In this respect, my invention differs from those of past practice in that I seal externally of the furnace rather than internally. My seal is always visible, and the combination of the automatic features of the feed-bed laying, as accomplished by the rotating hopper, makes for perfect operation. Stated in other words, changes within the interior of the furnace itself, which may affect the seal on old-type stokers, have little or no effect upon the efficacy of my seal, since it is entirely outside the furnace. As long as there is feed material available to fill the traveling hopper, the seal will be maintained. Of course if the traveling hopper becomes empty and the plow continues to feed the material to the melting zone, then trouble will occur. Being entirely visible, there is practically no occurrence, or excuse for occurrence, of such conditions.

The old type of feeding system generally depended upon feeding-in sufficiently below the crest of the sloping embankment so that a considerable pile of material would build up above the point of feeding, vertically, as well as over it, horizontally. The feed material became sticky due to the influence of heat, and provided the seal required for the system. In contradistinction, as will be understood from the foregoing description, I maintain an open channel just below the extremity of the firebox. Furthermore, I provide the upper cutter blade at plane $a$ of Fig. 5 to prevent or discourage any accumulation of material above the plane $a$ of said figure. The slicing action of the cutter blades prevents any possibility of obtaining a trustworthy seal at the crest of the bed 17a. Therefore I have had to provide sufficient depth within the slot 3, and other accessory mechanisms, to allow me to obtain my sealing entirely without the furnace. The depth of the material within the slot 3 is generally kept from four inches to twelve inches above the plane $a$ of Fig. 5.

The removal of the product of the roasting, calcining, or fusing operations may be accomplished by any one of several suitable means. As previously noted, the product flows out the opening 18 of Fig. 1. It may be caught in any suitable device, allowed or caused to flow to other heating or calcining equipment, to conveyor belts, molds, etc. In some instances it is only necessary to provide the opening 18, the material slipping out directly upon a conveyor, etc. In such instances, of course, the flue gas is removed at some other point within the furnace. In the furnace depicted here for purposes of illustration, I prefer to take the flue gases out of the bottom, for reasons previously stated.

Referring to Figure 1, I show a suitable nozzle 60 which may be attached to the opening 18 of the furnace for conducting both the hot gases and the product from the furnace. In this diagram the molten material streams down into the lowermost part of the nozzle, where it is caught by the conveyor buckets 61. The hot gases pass out through the opening 62.

I have found it advantageous to restrict the orifice 62 through which the hot gases pass from the nozzle, so that a small amount of hot gas will puff out of the lower opening 63 of Figure 1, through which the furnaced product passes.

The hot gases passing out of the nozzle opening 62 of Figure 1 may contain a small quantity of dust. If melting is taking place upon the fusion bed, then this dust is generally molten or plastic. In the instance of fusing borax, employing fuel oil as an energy source, there is liberated or volatilized from the borax and/or from the dust a quantity of boric acid, due to the interaction of the sulphur of the fuel oil, the oxygen and the borax. This liberated boric acid has a low melting point. It passes out of the nozzle opening of Figure 1, together with the other dust.

I have experienced considerable trouble from the small quantities of dust carried with the exit gases. A portion of such dust has been found to collect in the flues, etc., following the nozzle, slowly forming a sticky deposit. This deposit continued to grow, finally choking up the flues with a sticky or plastic coating. To remove such deposits, two methods have been tried—melting them out, and shutting down, cooling and dislodging them. Neither is entirely satisfactory.

To overcome this difficulty, I have devised the "chiller" 45. This chiller is attached to the nozzle of Figure 1 by means of a short bricklined adapter 46. The principle of this accessory is to admix thoroughly and quickly with the flue gases from the furnace sufficient of a cooling gas to "freeze" or chill the molten dust particles carried by said hot flue gas. Once chilled, the particles lose their adhesive qualities and may be removed by other means.

While such a chiller may be constructed in a variety of ways, I illustrate only one form which I have built and found to be eminently satisfactory. For economical construction, I prefer to make this chiller almost entirely of steel. The inner steel box 47 is surrounded by an outer steel shell 48. Between these two shells I cause a current of air to pass. This current of air serves to keep the inner shell 47 from becoming overheated, and the combination keeps the outer steel shell relatively cool, thereby preventing excessive heat losses. Air may be introduced between the shells under pressure, such, for instance, as through the duct 49, which may be controlled by suitable damper 50. The cooler mixture passes out the outlet duct 51.

If desired, this outlet duct 51 may be maintained under negative pressure, and instead of introducing the cooling gas through the duct 49 it may be allowed to enter suitable holes (not shown) in the exterior shell. These holes may be fitted with suitable adjusting gates or covers so as to obtain the desired distribution with respect to cooling the steel work. The interior shell is fitted with inlet holes 53 for introducing the cold gas and mixing it with hot flue gas. At a point near the entrance of the hot flue gas I prefer to provide a plurality of small holes 54 for mixing thoroughly the cold gas with the hot incoming flue gas at that point. Suitable doors 55 may be provided for inspection and clean-out purposes.

As previously stated, I find it advantageous to maintain, at the bottom of the nozzle shown in Figure 1, a slight positive pressure so that a little of the hot flue gas will puff out of the lower extremity. The necessary balance of pressure may be maintained by introducing cold gas, under pressure through duct 49 of Figure 1 combined with suitable dampers or resistance located in duct 51 (not shown), or its continuation. When air is supplied to the chiller under pressure through duct 49 the gates covering the outer-shell holes are, of course, closed. By such means, I have found that very nice control of this point may be obtained.

While the particular process and apparatus herein described is well adapted to carry out the objects of the invention, it is understood that various changes and modifications may be made, all coming within the scope of the appended claims.

I claim:

1. An apparatus for controlling the feed of material to a sloping bed of material undergoing treatment, comprising cutting means movable horizontally and extending to the surface of the bed to cut a channel of loose material through said bed to the surface of treatment, and a means for conveying material through said channel to the sloping surface of the bed.

2. An apparatus for controlling the feed of material to a sloping bed of material undergoing treatment comprising feeding means positioned within said bed and extending substantially to the surface of treatment, and means for moving said feeding means through said bed while holding the same in substantially the same relative position with reference to the surface of treatment of said bed.

3. An apparatus for controlling the feed of material to a sloping bed of material undergoing treatment which comprises cutting means positioned within said bed and extending substantially to the surface of treatment, a separate feeding member positioned within the zone of said bed cut by said cutting means, means for moving said cutting and feeding means in a horizontal path, and means for adjusting the angle between the feeding means and the direction of travel thereof to vary the rate of feed induced by movement of said member.

4. An apparatus for controlling the feed of material to a sloping bed of material undergoing treatment, which comprises upper and lower cutting means, said cutting means being positioned within said bed and one at least thereof extending substantially to the surface of treatment, the cutting means being disposed apart a short vertical distance so that movement thereof forms a channel of loose material, means for moving said cutting means in a horizontal path to form said channel, and a feeding member positioned to operate between the lines of operation of the upper and lower cutting members, and means for moving said feeding member to feed material to the surface of said bed.

5. In a furnace structure, the combination of a heating chamber for holding an embankment of material to be treated, means at the top of the embankment adapted to receive and hold a quantity of material to be treated, plow means adapted to move horizontally through the embankment and transfer the material encountered into the heating zone, said plow means comprising a horizontal member capable of being adjusted to vary the angle which its front surface makes with its direction of travel, and means for moving said plow horizontally.

6. A furnace comprising means forming a chamber for holding an embankment of material to be treated, a fire-box supported above said chamber and telescopically extending thereinto and forming in said chamber a feeding slot, the lower edge of said fire-box extending into an engagement with the embankment of material, cutting means positioned under the lower edge of said fire-box and within said embankment and extending substantially to the surface thereof, and means for moving said cutting means along the lower edge of said fire-box for maintaining the material contacting the lower edge of the fire-box in a loose condition.

7. A furnace comprising means forming a chamber for holding an embankment of material to be treated, a fire-box supported above said chamber and telescopically extending thereinto and forming in said chamber a feeding slot, the lower edge of said fire-box extending into an engagement with the embankment of material, cutting means positioned under the lower edge of said fire-box and within said embankment and extending substantially to the surface thereof, means for moving said cutting means along the lower edge of said fire-box for maintaining the material contacting the lower edge of the fire-box in a loose condition, and a separate feeding member movable through the channel so produced for feeding material therethrough to the surface of treatment.

8. An apparatus for controlling the feed of material to a sloping bed of material undergoing treatment, which comprises upper and lower cutting means, said cutting means being positioned within said bed and one at least thereof extending substantially to the surface of treatment, the cutting means being disposed apart a short vertical distance so that the movement thereof forms a channel of loose material, means for moving said cutting means in a horizontal path to form said channel, a feeding member positioned to operate between the lines of operation of the upper and lower cutting members, means for moving said feed member to feed material to the surface of said bed, and feed supply means for supplying feed to the slot movable horizontally along said slot to maintain substantially constant the head of feed material therein.

9. A furnace comprising means forming a chamber for holding an embankment of material to be treated, a fire-box supported above said chamber and telescopically extending thereinto and forming therewith a feeding slot, a feed hopper mounted for horizontal movement along said slot, said feeding hopper having an outlet orifice in communication with the slot at the level to which it is desired to fill the slot.

10. A method of feeding material to a sloping bed of material undergoing treatment which comprises cutting a channel through said bed to substantially the surface of treatment to maintain the material in the channel in a loose condition, said channel extending over a substantial distance in the bed and feeding material through said channel to the surface of treatment.

11. A process of controlling the feed of material to a sloping bed of material undergoing treatment, which process comprises continuously cutting a horizontal channel through the bed to the surface of treatment over a substantial distance in the bed without said cutting operation effecting a substantial feed of material, and separately forcing material to the surface of treatment through said channel without substantially disturbing the remainder of the bed.

12. The method of maintaining and feeding a sloping embankment of material undergoing treatment, which comprises continuously maintaining a head of material in communication with said embankment, continuously cutting a horizontal channel from said head of material to the surface of treatment over a substantial distance, and continuously pushing fresh material from said head through the channel to the surface of treatment without substantially disturbing the position of the remainder of the embankment.

13. The method of treating material which comprises forming an embankment of material to undergo treatment, heating the surface of the embankment of material while continuously withdrawing treated material from the base of the embankment, cutting and maintaining a channel of loose material through said embankment to substantially the surface of treatment, and feeding material through said channel to be dispersed over the sloping surface of the embankment.

LEROY G. BLACK.